S. L. CLUETT.
ATTACHMENT FOR MOWERS AND THE LIKE.
APPLICATION FILED JULY 23, 1917.
1,275,390.
Patented Aug. 13, 1918.
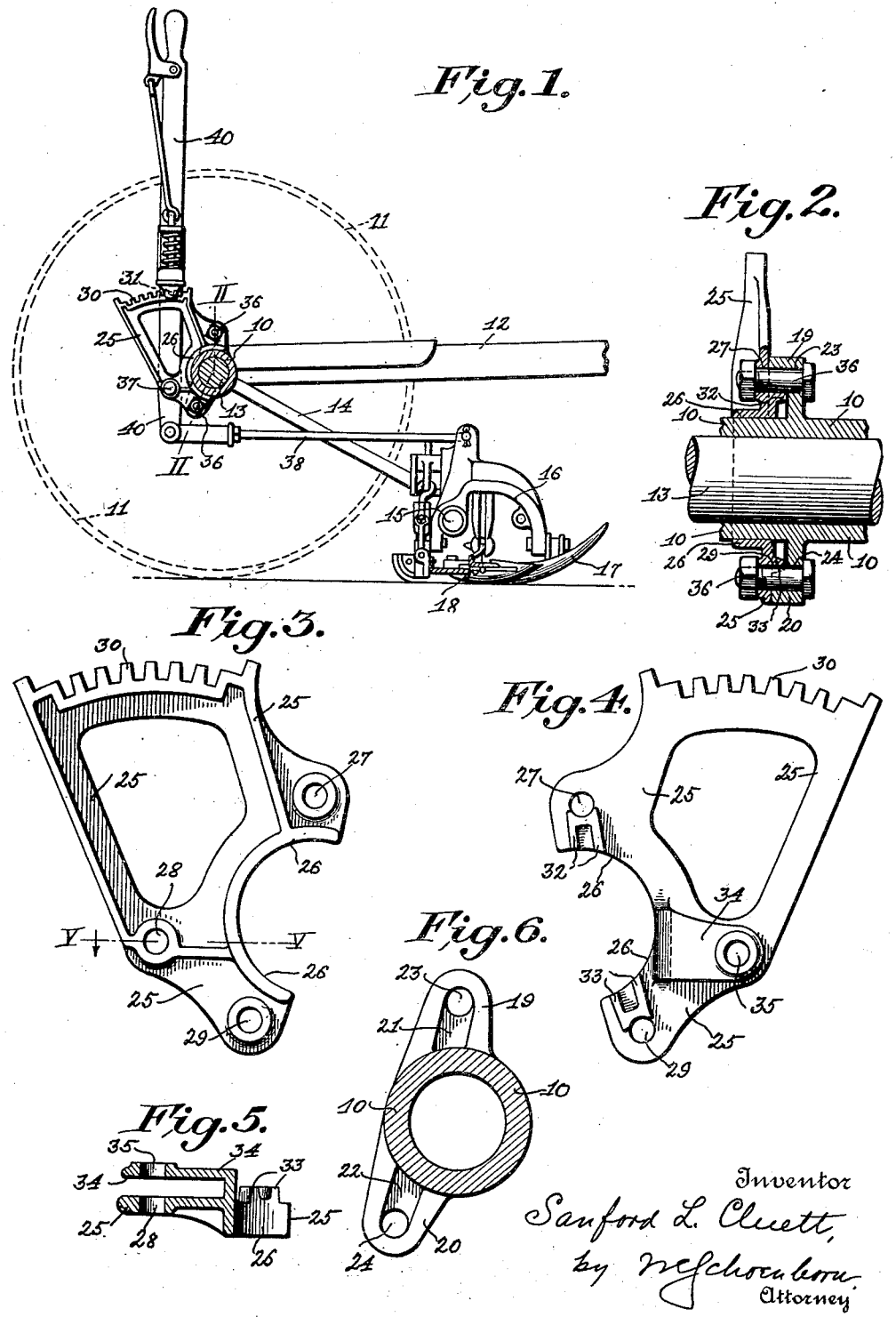
Inventor
Sanford L. Cluett,
by W. Schoenborn
Attorney

UNITED STATES PATENT OFFICE.

SANFORD LOCKWOOD CLUETT, OF HOOSICK FALLS, NEW YORK.

ATTACHMENT FOR MOWERS AND THE LIKE.

1,275,390.      Specification of Letters Patent.      Patented Aug. 13, 1918.

Application filed July 23, 1917. Serial No. 182,209.

*To all whom it may concern:*

Be it known that I, SANFORD L. CLUETT, a citizen of the United States, residing at Hoosick Falls, in the county of Rensselaer and State of New York, have invented certain new and useful Improvements in Attachments for Mowers or the like, of which the following is a specification.

My invention relates to an attachment for mowers or the like and more particularly to a construction and arrangement for rigidly securing the tilting lever quadrant to the main frame of the mower, so that the said quadrant after having been attached to the main frame, will not become loose or detached and firmly hold the hanger, its shoe and finger-bar and the connected tilting rod in their adjusted position after the attached and coöperating tilting lever has been properly adjusted and locked in the notches of the ratchet formed in the quadrant.

The objects of my invention are—

First, to construct a quadrant which is simple in construction, easily adjusted in a firm and rigid position, attached or removed with a minimum of labor, and at the same time inexpensive in its manufacture.

Second, to construct a quadrant and its means for securing the same to the main frame of the mower, so that all the stresses induced by the shaking of the mower are carried by the tilting lever and transferred directly from the quadrant to the main frame in such a manner that such stresses have no tendency to disturb the proper adjustment between the quadrant and lever, and the fixed and proper position of the quadrant on the main frame.

Third, other objects and advantages of the invention will appear from the detailed description and mode of construction and applying the same which will be hereinafter given.

The invention consists of structural characteristics and relative arrangements of elements which will be hereinafter more fully described and particularly pointed out in the appended claims.

In the drawings, in which similar reference characters indicate the same parts in the several figures, Figure 1 is a side and fragmentary view, partly in section, of a mower showing the manner of attaching my improved tilting lever quadrant.

Fig. 2 is an enlarged sectional view taken on line II—II of Fig. 1.

Fig. 3 is an elevation of one side of the tilting lever quadrant.

Fig. 4 is a view of the reverse side of the quadrant from that shown in Fig. 3.

Fig. 5 is a sectional view taken on line V—V of Fig. 3, and

Fig. 6 is an end view of a section of the mower main frame to which the quadrant is attached.

Referring to Figs. 1 and 2, 10 is a section of the tubular portion of the main frame of the usual form of mower which is mounted upon two supporting traction wheels 11, one only of which is shown in dotted lines, and having the common form of draft tongue 12 rigidly secured thereto. The tubular portion 10 of the main frame forms the bearing for the main axle 13, and said axle 13 being keyed to the traction wheels 11 and constitutes no essential feature of the present invention. 14 is the push bar connected with some portion of the main frame 10 and the draw bar 15 which rotatably supports on its outer end the hanger 16, carrying the shoe 17 and cutter bar 18 as is common and well known in this class of inventions and therefore said parts need no further showing or description.

On the tubular portion of the main frame 10 at the section adjacent where it is usual to support the tilting lever quadrant, are preferably arranged and integrally formed therewith, upper and lower ears 19 and 20, as shown in Figs. 2 and 6, said ears being provided with wedge-shaped recesses or seats 21 and 22, and circular openings 23 and 24, for purposes to be presently described.

Referring to Figs. 3, 4 and 5, the improved tilting lever quadrant 25 is so cast and machined as to have formed therein a semi-circular cut-out section or arcuate-shaped recess 26 near its lower end which is adapted to partially encircle and form a seat for the tubular portion of the main frame 10 as shown in Fig. 1, and is also provided with circular openings 27, 28 and 29 for the reception of bolts and purposes to be hereinafter described.

At the upper portion of the quadrant 25 is formed a series of teeth 30 to be engaged by the spring-actuated pawl or finger 31 carried by the tilting lever 40, see Fig. 1, as is common in this class of devices. On one side of the tilting lever quadrant 25 are provided wedge-shaped lugs 32 and 33 adjacent to the openings 27 and 29, and a short bracket 34, having an opening 35 corresponding with the opening 28, as shown in Fig. 4.

The manner of applying the tilting lever quadrant 25 constructed as shown in Figs. 3 and 4, is as follows:

Said quadrant 25 is so placed that its plane is normal to the axis of the axle 13 and the tubular portion of the main frame 10 registers with semi-circular cut-out portion 26, and the lugs 32 and 33 face toward the ears 19 and 20. After the quadrant is so arranged, it is oscillated or adjusted until its lug 32 is opposite to the recess 21 and the lug 33 opposite to the recess 22, when the quadrant 25 is moved in juxtaposition to the ears 19 and 20 on the tubular portion of the main frame 10, and the lugs 32 and 33, are seated in their corresponding recesses 21 and 22 in the ears 19 and 20, as shown in Fig. 2. When the quadrant 25 is disposed, as just described with respect to its lugs 32 and 33 and seats 21 and 22, suitable bolts 36, 36 are passed through the registering openings 27 and 29, and 23 and 24, respectively, in the quadrant 25 and ears 19 and 20, and when said bolts 36 are tightened up, the quadrant 25 is firmly and rigidly clamped to the main frame 10 by the close fitting of the arcuate-shaped recess 26 of the quadrant 25 around the adjacent semi-circular portion of the main frame 10, and the snug fit and contact of the wedge-shaped lugs 32 and 33 into their correspondingly shaped recesses or seats 21 and 22 in the ears 19 and 20 on the main frame.

After the quadrant 25 is so secured to the main frame 10, the tilting lever 40 is pivotally supported to said quadrant by means of a bolt 37 passing through the registering openings 28 and 35 in the quadrant 25 and an opening in the lower portion of the lever 40, and the lower end of the tilting lever 40 is connected by means of the tilting rod 38 with the upper section of the hanger 16, as is common in mowers and forms no part of the present invention.

From the foregoing disclosed manner of constructing, assembling and attaching my improved quadrant, it will be readily seen that all the functions and advantages set up in the statement of invention are fully and efficiently carried out, and while I have shown and described my preferred form of the invention, it will be understood that I do not limit its use and application to mowers only, but any other apparatus of a similar character in which a lever quadrant is employed is contemplated by my invention, and also while I have shown and described the lugs 32 and 33 on the quadrant 25 and the coöperating recesses 21 and 22 in the ears 19 and 20, I am not limited to this particular arrangement, as the lugs 32 and 33 could be disposed on the ears 19 and 20 and their coöperating recesses and seats 21 and 22 on the quadrant 25, without departing from the spirit of my invention.

What I claim is:

1. An attachment for mowers or the like having in combination with a main frame provided with a plurality of ears projecting from the same, a lever quadrant, said ears and quadrant having inter-engaging lugs and recesses, and means for holding the ears and quadrant in engagement.

2. An attachment for mowers or the like having in combination with a main frame provided with an upper and a lower ear projecting from and made integral with the same, a lever quadrant, said ears and quadrant having inter-engaging wedge-shaped lugs and recesses, and means for holding the ears and quadrant in engagement.

3. An attachment for mowers or the like having in combination with a main frame having a circular cross-section and provided with a plurality of ears projecting from and integral with the same, a lever quadrant having an arcuate-shaped recess in which said main frame is seated, said ears and quadrant having inter-engaging wedge-shaped lugs and recesses, and means for holding the ears and quadrant in engagement and the main frame in the arcuate-shaped recess.

4. An attachment for mowers or the like having in combination with a main frame provided with a plurality of ears projecting from the same, a lever quadrant, means for preventing relative movement of said ears and quadrant consisting of lugs upon one of said parts and recesses in the other, said lugs and recesses adapted for inter-engagement, and means for holding the ears and quadrant in engagement.

5. An attachment for mowers or the like having in combination with a main frame having a portion circular in cross-section and provided with an upper and a lower ear integral with and projecting from the same, a lever quadrant having an arcuate-shaped seat adapted to receive a section of the main frame, means for preventing relative movement of said ears and quadrant consisting of lugs upon one of said parts and recesses in the other, said lugs and recesses adapted for inter-engagement, and means for holding the ears and quadrant in engagement.

6. An attachment for mowers or the like having in combination with a main frame provided with a plurality of ears on the same and each of said ears having a recess, a lever quadrant having a projecting lug for each of said recesses so constructed and arranged as to be adapted to be seated in said recesses, and means for holding said lugs seated within the recesses.

7. An attachment for mowers or the like having in combination with a main frame provided with a plurality of ears on and made integral with the same and each of said ears having a wedge-shaped recess, a lever quadrant having a projecting lug of wedge-shape for each of said recesses so constructed and arranged as to be adapted to be seated in said recesses, and means for holding said lugs seated within the recesses.

8. An attachment for mowers or the like having in combination with a main frame provided with an upper and a lower ear made integral with and projecting from the same and each of said ears having a recess, a lever quadrant having a seat formed therein to receive the main frame and a lug for each of said recesses so constructed and arranged as to be adapted to be seated in said recesses, and means for holding said lugs seated within the recesses.

In testimony whereof, I affix my signature.

SANFORD LOCKWOOD CLUETT.

Copies of this patent may be obtained for five cents each, by addressing the "Commissioner of Patents, Washington, D. C."